US007568946B1

(12) United States Patent
Goeke

(10) Patent No.: US 7,568,946 B1
(45) Date of Patent: Aug. 4, 2009

(54) TRIAXIAL CABLE WITH A RESISTIVE INNER SHIELD

(75) Inventor: Wayne C. Goeke, Hudson, OH (US)

(73) Assignee: Keithley Instruments, Inc., Cleveland, OH (US)

( * ) Notice: Subject to any disclaimer, the term of this patent is extended or adjusted under 35 U.S.C. 154(b) by 0 days.

(21) Appl. No.: 11/653,541

(22) Filed: Jan. 16, 2007

(51) Int. Cl.
*H02R 9/05* (2006.01)

(52) U.S. Cl. .................................. 439/580; 174/113 R

(58) Field of Classification Search ................. 439/580, 439/578; 174/113 R, 75 C
See application file for complete search history.

(56) References Cited

U.S. PATENT DOCUMENTS

| | | | | | |
|---|---|---|---|---|---|
| 3,860,824 | A | * | 1/1975 | Stone | 250/390.01 |
| 4,376,920 | A | * | 3/1983 | Smith | 333/12 |
| 4,626,810 | A | * | 12/1986 | Nixon | 333/243 |
| 4,641,110 | A | * | 2/1987 | Smith | 333/12 |
| 4,642,417 | A | * | 2/1987 | Ruthrof et al. | 174/36 |
| 4,793,356 | A | * | 12/1988 | Misic et al. | 600/422 |
| 5,150,442 | A | * | 9/1992 | Desmons | 385/101 |
| 5,539,323 | A | * | 7/1996 | Davis, Jr. | 324/690 |
| 6,225,565 | B1 | * | 5/2001 | Prysner | 174/120 SC |
| 6,239,379 | B1 | * | 5/2001 | Cotter et al. | 174/110 R |
| 6,293,005 | B1 | * | 9/2001 | Van Den Berg et al. | 29/828 |
| 6,815,617 | B1 | * | 11/2004 | Gebs et al. | 174/113 AS |
| 7,138,810 | B2 | * | 11/2006 | Lesher et al. | 324/754 |
| 2005/0173149 | A1 | * | 8/2005 | Gouge et al. | 174/125.1 |
| 2006/0219425 | A1 | * | 10/2006 | Fagrell et al. | 174/110 PM |

OTHER PUBLICATIONS

S. Sali; Triaxail cable designs with optimum braided shields; Jul. 1990; IEEE Procediings; vol. 137, PtA, No. 4; 165+.*

* cited by examiner

*Primary Examiner*—Michael C Zarroli
(74) *Attorney, Agent, or Firm*—Pearne & Gordon LLP

(57) ABSTRACT

A triaxial cable having a center conductor; an outer shield conductor coaxial with the center conductor; and an inner shield conductor coaxial with the center conductor and located between the center conductor and the outer shield conductor. The inner shield conductor has a resistance adapted to control resonance on the inner shield.

8 Claims, 2 Drawing Sheets

TRIAXIAL CABLE WITH A RESISTIVE INNER SHIELD

BACKGROUND OF THE INVENTION

The present invention relates to triaxial cables and, in particular, to triaxial cables useful in combined DC/AC measurement systems.

SUMMARY OF THE INVENTION

A triaxial cable having a center conductor; an outer shield conductor coaxial with the center conductor; and an inner shield conductor coaxial with the center conductor and located between the center conductor and the outer shield conductor. The inner shield conductor has a resistance adapted to control resonance on the inner shield.

DESCRIPTION OF THE PREFERRED EMBODIMENTS

Figure 1:
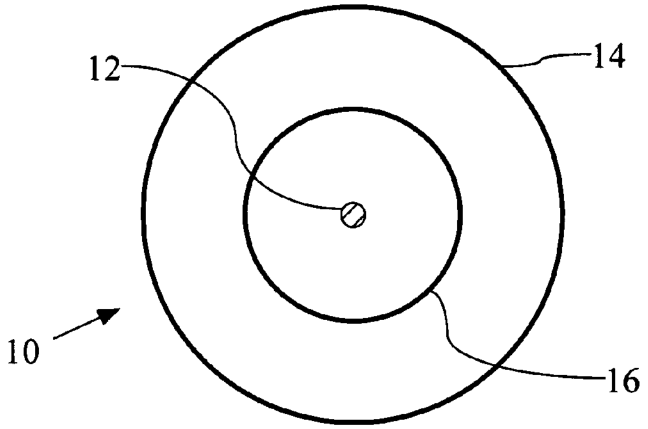
FIG. 1 is an axial cross sectional view of an example of the invention.
Figure 2:
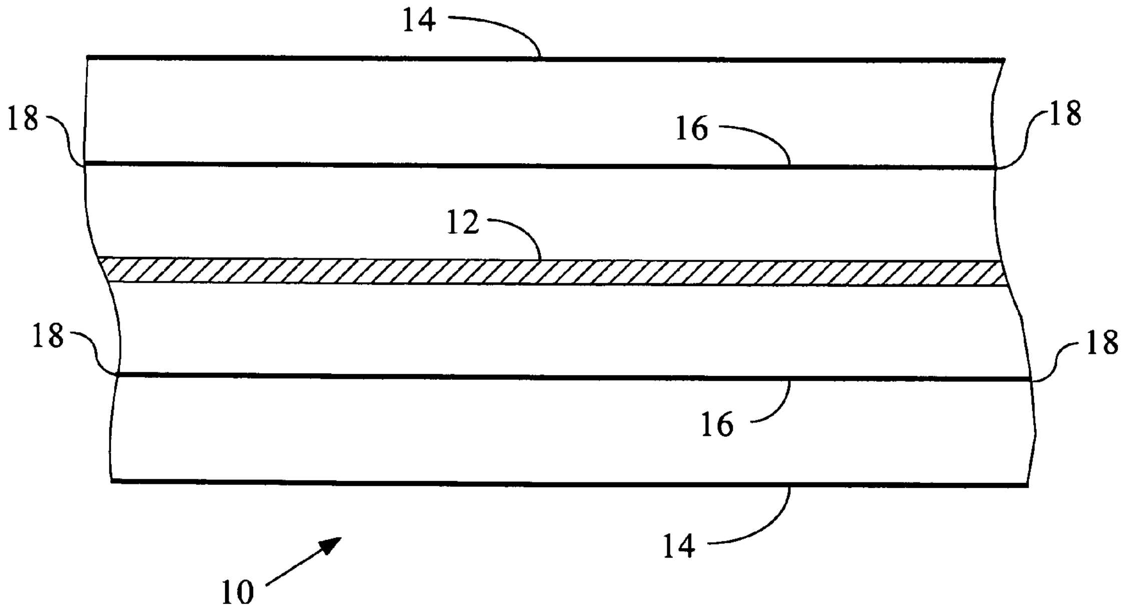
FIG. 2 is a longitudinal cross sectional view of an example of the invention.

Referring to FIGS. 1 and 2, a triaxial cable 10 includes a center conductor 12, an outer shield conductor 14 and an inner shield conductor 16. The outer shield conductor 14 and the inner shield conductor 16 are coaxial with the center conductor 12. The inner shield conductor 16 has a resistance (ohms/foot) chosen to control resonance on the inner shield conductor 16.

Figure 3:
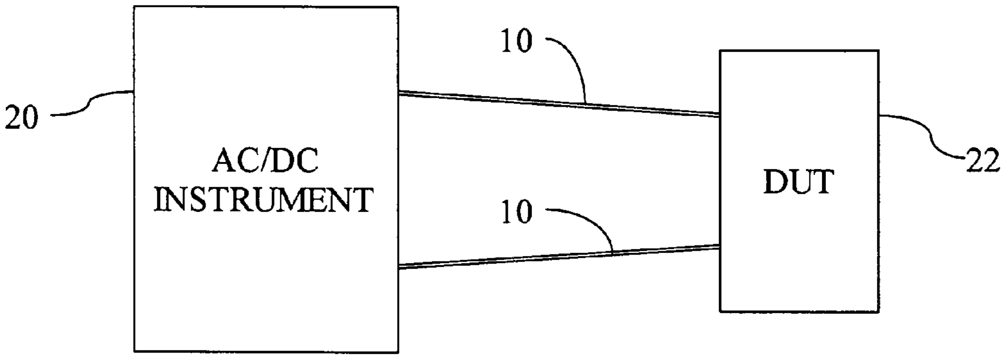
FIG. 3 is a schematic diagram of a measurement system using an example of the invention.

Referring to FIG. 3, two lengths of the cable 10 are connected between a combination DC and AC test instrument 20 and a device under test (DUT) 22.

During a DC measurement, the center conductors 12 are used to measure a DC parameter of the DUT 22. Each of the inner shield conductors 16 is driven to a voltage equal to that found on the respective center conductor 12. This may be done, for example, with unshown op-amps. This results in the center conductors 12 being guarded from any electrostatic leakage to or from the center conductors 12.

During an AC measurement, at least one of the lengths of cable 10 is used to measure an AC parameter of the DUT 22. A characteristic impedance occurs between the center conductor 12 and the outer shield conductor 14. The inner shield conductor 16 is disconnected and allowed to float to avoid disturbing this characteristic impedance. The unconnected ends 18 of the inner shield conductors 16 however may still be subject to parasitic coupling. In general, this would result in resonance effects; in particular, standing waves occurring on the inner shield conductor 16, however, the resistance of the inner shield conductor 16 dissipates this resonance.

The inner shield conductor 16 may have, for example, a resistance of between 0.1 and 100 ohms per foot. A value of 1 ohm per foot, for example, may be used.

Figure 4:
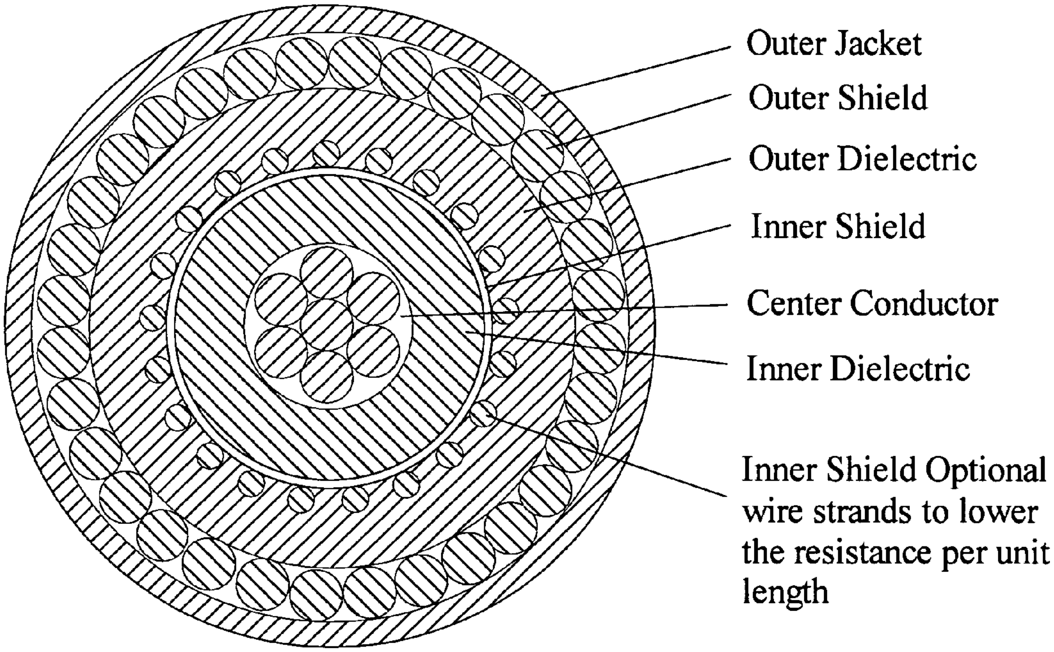
FIG. 4 is an axial cross sectional view of some additional examples of the invention.

Various techniques may be used to achieve the desired resistance in the inner shield conductor 16. FIG. 4 indicates some possible approaches.

The inner shield conductor 16 may be, for example, formed from a lossy dielectric layer that is coaxial with the center conductor 12, for example, a carbon matrix layer. If the lossy dielectric is too lossy, it is possible to add some metallic conductors that cooperate with the dielectric layer to lower the resistance of the layer. These metallic conductors may be, for example, in the form of a wire, a braid, or a foil. These metallic conductors may be formed from a metallic poor conductor or relatively low cross section filaments.

The inner shield conductor 16 may be, for example, formed from a metallic poor conductor, for example, some steels are poor conductors. This inner shield conductor 16 may be formed from wires, braids, or a foil. Also thin or low cross section material may be used.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A triaxial cable, said cable comprising:
- a center conductor;
- an outer shield conductor coaxial with said center conductor;
- an inner shield conductor coaxial with said center conductor and located between said center conductor and said outer shield conductor;
- an outer dielectric layer located between said outer shield conductor and said inner shield conductor; and
- an inner shield dielectric layer located between said inner shield conductor and said center conductor, wherein said inner shield conductor has an electrical resistance adapted to dissipate resonance on said inner shield.

2. A triaxial cable according to claim 1 wherein said resistance is between 0.1 and 100 ohms per foot.

3. A triaxial cable according to claim 2 wherein said resistance is about 1 ohm per foot.

4. A triaxial cable according to claim 1 wherein said inner shield conductor comprises a lossy dielectric layer.

5. A triaxial cable according to claim 4 wherein said inner shield conductor further comprises a metallic conductor in cooperation with said lossy dielectric layer.

6. A triaxial cable according to claim 5 wherein said metallic conductor is at least one of a wire, a braid, or a foil.

7. A triaxial cable according to claim 1 wherein said inner shield conductor comprises a metallic conductor.

8. A triaxial cable according to claim 7 wherein said metallic conductor is at least one of a wire, a braid, or a foil.

* * * * *